United States Patent [19]

Tsutsui et al.

[11] Patent Number: 5,700,750

[45] Date of Patent: Dec. 23, 1997

[54] PROCESS FOR POLYMERIZATION OF ALPHA-OLEFINS

[75] Inventors: Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 449,284

[22] Filed: May 24, 1995

Related U.S. Application Data

[63] Continuation of Ser. No. 268,116, Jul. 6, 1994, abandoned, which is a continuation of Ser. No. 140,894, Oct. 25, 1993, abandoned, which is a continuation of Ser. No. 512,508, Apr. 20, 1990, abandoned, which is a continuation of Ser. No. 356,706, May 24, 1989, abandoned, which is a continuation of Ser. No. 103,583, filed as PCT/JP86/00650, Dec. 26, 1986, abandoned.

[30] Foreign Application Priority Data

Dec. 26, 1985 [JP] Japan ................. 60-291893

[51] Int. Cl.$^6$ ................. C08F 4/648; C08F 4/656; C08F 4/655; C08F 10/00

[52] U.S. Cl. ................. 502/117; 502/103; 502/119; 526/114; 526/116; 526/119; 526/128; 526/137; 526/151; 526/152; 526/153; 526/160; 526/943; 526/348; 526/348.5; 526/348.4; 526/282; 526/348.6

[58] Field of Search ................. 502/103, 119, 502/117

[56] References Cited

U.S. PATENT DOCUMENTS

| | | | |
|---|---|---|---|
| 3,104,249 | 9/1963 | Clauss et al. | 526/160 |
| 4,530,914 | 7/1985 | Ewen et al. | 526/160 |
| 4,542,199 | 9/1985 | Kaminsky et al. | 526/160 |
| 4,701,432 | 10/1987 | Wellborn | 526/114 |
| 4,704,491 | 11/1987 | Tsutsui et al. | 526/160 |
| 4,791,180 | 12/1988 | Turner | 526/160 |
| 4,808,561 | 2/1989 | Wellborn | 526/160 |

FOREIGN PATENT DOCUMENTS

| | | | |
|---|---|---|---|
| 220436 | 2/1959 | Australia | 526/160 |
| 129368 | 12/1984 | European Pat. Off. | 526/160 |
| 60-130604 | 7/1985 | Japan . | |
| 60-260602 | 12/1985 | Japan . | |

OTHER PUBLICATIONS

Matkovski, Polymer Science (USSR), vol. 16, No. 1 (1974), 207–215.

*Primary Examiner*—Edward J. Smith
*Attorney, Agent, or Firm*—Sherman and Shalloway

[57] ABSTRACT

A process for producing an alpha-olefin polymer, which comprises polymerizing an alpha-olefin in the presence of a catalyst formed from (A) a transition metal compound comprising (A-1) a transition metal atom, (A-2) a hetero atom-containing ligand containing a heteroatom selected from oxygen, sulfur, nitrogen and phosphorus capable of forming a bond with the transition metal atom, and (A-3) a ligand having a conjugated $\pi$ electron through which the ligand can be bonded to the transition metal atom (A-1), and (B) an aluminoxane. The transition metal compound may be pre-treated with (C) an organometallic compound, or (D) a halogen-containing inorganic compound of an element of Group III, IV or V of the periodic table.

1 Claim, No Drawings

PROCESS FOR POLYMERIZATION OF ALPHA-OLEFINS

This application is a continuation of application Ser. No. 08/268,116, filed Jul. 6, 1994; now abandoned which is a continuation of application Ser. No. 08/140,894, filed Oct. 25, 1993; now abandoned which is a continuation of application Ser. No. 07/512,508, filed Apr. 20, 1990; now abandoned which is a continuation of application Ser. No. 07/356,706, filed May 24, 1989; now abandoned which is a continuation of application Ser. No. 07/103,583, filed Aug. 14, 1987; now abandoned which is the national phase entry of International Application No. PCT/JP86/00650, filed Dec. 26, 1986.

TECHNOLOGICAL FIELD

This invention relates to a process for polymerizing an alpha-olefin in the presence of a highly active polymerization catalyst. More specifically, it relates to a process for producing an alpha-olefin polymer having a narrow molecular weight distribution and/or composition distribution in the presence of a specific transition metal compound and an aluminoxane.

BACKGROUND TECHNOLOGY

A process has heretofore been known for producing an alpha-olefin copolymer by copolymerizing ethylene with an alpha-olefin in the presence of a titanium-type catalyst comprising a titanium compound and an organo-aluminum compound or a vanadium-type catalyst comprising a vanadium compound and an organoaluminum compound. Generally, ethylene/alpha-olefin copolymers obtained with the titanium-type catalyst have a broad molecular weight distribution, and a broad composition distribution. Ethylene/alpha-olefin copolymers obtained with the vanadium-type catalyst have a narrower molecular weight distribution and composition distribution than those obtained with the titanium-type catalyst. It is desired to provide in a particular field alpha-olefin polymers, particularly ethylene/alpha-olefin copolymers, having much narrowe molecular weight and composition distributions.

Catalysts comprising zirconium compounds and aluminoxanes were recently proposed as a new Ziegler-type olefin polymerization catalyst.

Japanese Laid-Open Patent Publication No. 19309/1983 (corresponding to U.S. Pat. No. 4,542,199) discloses a process which comprises polymerizing ethylene with at least one alpha-olefin having 3 to 12 carbon atoms at a temperature of −50° to 200° C. in the presence of a catalyst comprising a transition metal-containing compound represented by the following formula (cyclopentadienyl)$_2$MeR'Hal wherein R' represents cyclopentadienyl, $C_1$–$C_6$ alkyl or halogen, Me represents a transition metal, and Hal represents halogen,
and a linear aluminoxane represented by the following formula Al$_2$OR$_4$$^2$(Al(R$^2$)—O)$_n$ wherein R$^2$ represents methyl or ethyl, and n is a number of 4 to 20,
or a cyclic aluminoxane represented by the following formula

wherein R$^2$ and n are as defined.

This patent document states that to adjust the density of the resulting ethylene copolymer, ethylene should be polymerized in the presence of a small amount (up to 10% by weight) of a slightly long-chain alpha-olefin or alpha-olefin mixture.

Japanese Laid-Open Patent Publication No. 95292/1984 (corresponding to U.S. Pat. No. 4,544,762) describes an invention relating to a process for producing a linear aluminoxane represented by the following formula

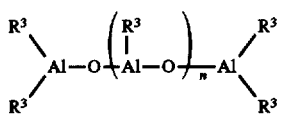

wherein n is 2 to 40 and R$^3$ represents a $C_1$–$C_6$ alkyl group,
and a cyclic aluminoxane represented by the following formula

wherein n and R$^3$ are as defined.

This patent document states that when ethylene is polymerized in the presence of a mixture of methylaluminoxane produced by the above process and a titanium or zirconium bis(cyclopentadienyl) compound, polyethylene can be obtained in an amount of at least 25 million grams per gram of the transition metal per hour.

Japanese Laid-Open Patent Publication No. 35005/1985 (corresponding to U.S. Pat. No. 4,536,484) discloses a process for producing an olefin polymerization catalyst, which comprises reacting an aluminoxane compound represented by the following formula

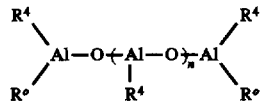

wherein R$^4$ is $C_1$–$C_{10}$ alkyl, and R$^0$ forms together a bivalent —O— radical or represents R$^4$,
with a magnesium compound, chlorinating the reaction product, and treating the product with a compound of Ti, V, Zr or Cr. This patent document states that the resulting catalyst is especially suitable for copolymerization of a mixture of ethylene with a $C_3$–$C_{12}$ alpha-olefin.

Japanese Laid-Open Patent Publication No. 35006/1985 (corresponding to European Patent Application No. 128046A) discloses a combination of (a) a mono-, di- or tri-cyclopentadienyl of two or more different transition metals or a derivative thereof and (b) an alumoxane (aluminoxane). Example 1 of this patent document discloses that polyethylene having a number average molecular weight of 15,300 and a weight average molecular weight of 36,400 and containing 3.4% of propylene was obtained by polymerizing ethylene and propylene using bis (pentamethylcyclopentadienyl) zirconium dimethyl and alumoxane. In Example 2, a blend of polyethylene and an ethylene/propylene copolymer having a number average molecular weight of 2,000 and a weight average molecular weight of 8,300 and containing 7.1 mole % of propylene composed of a toluene-soluble portion having a number average molecular weight of 2,200 and a weight average molecular weight of 11,900 and containing 30 mole % of propylene and a toluene-insoluble portion having a number average molecular weight of 3,000 and a weight average molecular weight of 7,400 and containing 4.8 mole % of propylene was obtained by polymerizing ethylene and propylene using bis(pentamethylcyclopentadienyl) zirconium dichloride, bis(methylcyclopentadienyl) zirconium dichloride and alumoxane as a catalyst. Likewise, Example 3 describes a blend of LLDPE and an ethylene/propylene copolymer composed of a soluble portion having a molecular weight distribution ($\overline{M}w/\overline{M}n$) of 4.57 and containing 20.6 mole % of propylene and an insoluble portion having a molecular weight distribution of 3.04 and containing 2.9 mole % of propylene.

Japanese Laid-Open Patent Publication No. 35007/1985 (corresponding to European Patent Application No. 129368A) discloses a process which comprises polymerizing ethylene alone or with an alpha-olefin having at least 3 carbon atoms in the presence of a catalyst system comprising a metallocene and a cyclic alumoxane represented by the following formula

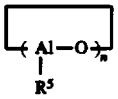

wherein $R^5$ represents an alkyl group having 1 to 5 carbon atoms, and n is an integer of 1 to about 20, or a linear alumoxane represented by the following formula

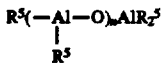

wherein $R^5$ and n are as defined above.

The polymer obtained by this process, according to the description of this patent document, has a weight average molecular weight of about 500 to about 1,400,000 and a molecular weight distribution of 1.5 to 4.0.

Japanese Laid-Open Patent Publication No. 35008/1985 (corresponding to U.S. Pat. No. 4,530,914) describes that polyethylene or an ethylene/$C_3$-$C_{10}$ alpha-olefin copolymer having a broad molecular weight distribution is produced by using a catalyst system comprising at least two metallocenes and alumoxane, and that this copolymer has a molecular weight distribution of 2 to 50.

Japanese Laid-Open Patent Publication No. 35009/1985 (corresponding to U.S. Pat. No. 4,540,753) discloses a process for producing a copolymer of ethylene and an alpha-olefin having a molecular weight distribution of as small as less than 2 by using a catalyst system comprising a vanadium compound and an organoaluminum compound.

The above prior art references suggest that a catalyst system composed of a combination of an aluminoxane noxane and a metallocene compound of a transition metal having an alkadienyl group (e.g., a cyclopentadienyl group), an alkyl group and/or a halogen atom as a ligand has high activity in the polymerization of alpha-olefins.

It is an object of this invention to provide a process for polymerizing an alpha-olefin in the presence of a novel catalyst composed of a transition metal metallocene compound and an aluminoxane.

Another object of this invention is to provide a catalyst comprising a transition metal component and an aluminoxane which has good stability against air or moisture and high polymerization activity.

Still another object of this invention is to provide a process for polymerizing an alpha-olefin, which can give a homopolymer of an alpha-olefin having a narrow molecular weight distribution, and an alpha-olefin copolymer having a narrow molecular weight distribution and a narrow composition distribution.

Yet another object of this invention is to provide a process for producing an alpha-olefin polymer having a low halogen content.

Further objects and advantages of this invention will become apparent from the following description.

DISCLOSURE OF THE INVENTION

According to this invention, these objects and advantages of this invention are achieved by a process for producing an alpha-olefin polymer, which comprises polymerizing an alpha-olefin in the presence of a catalyst formed from (A) a transition metal compound comprising
  (A-1) a transition metal atom,
  (A-2) a hetero atom-containing ligand containing a heteroatom selected from oxygen, sulfur, nitrogen and phosphorus capable of forming a bond with the transition metal atom, and
  (A-3) a ligand having a conjugated π electron through which the ligand can be bonded to the transition metal atom
  (A-), and (B) an aluminoxane.

The term "polymerization", as used in this invention, means both homopolymerization and copolymerization, and likewise, the term "polymer", as used herein, means both a homopolymer and a copolymer.

The catalyst used in this invention is formed from the transition metal compound (A) and the aluminoxane (B).

The transition metal compound catalyst component (A) comprises (A-1) a transition metal atom, (A-2) a hereto atom-containing ligand containing a hereto atom selected from oxygen, sulfur, nitrogen and phosphorus capable of forming a bond with the transition metal atom, and (A-3) a ligand having a conjugated π electron.

The transition metal atom (A-1) is preferably a transition metal of Group IVB of the periodic table, such as titanium, zirconium or hafnium. Titanium and zirconium are preferred, and zirconium is especially preferred.

Examples of the hereto atom-containing ligand (A-2) are hydrocarbon-oxy groups, hydrocarbon-thio groups, di(hydrocarbon)amino groups, di(hydrocarbon)phosphorus groups and a silyloxy group.

Examples of the ligand (A-3) having a conjugated π electron are cycloalkadienyl groups.

Preferred examples of the transition metal compound (A) are compounds represented as an average composition by the following formula (I)

wherein M represents a titanium, zirconium or hafnium atom, $R^1$ represents a cycloalkadienyl group, $R^2$ is a group selected from $OR^a$, $SR^b$, $NR_2^c$ or $PR_2^d$, $R^3$ and $R^4$ are identical or different and each represents a cycloalkadienyl group, an aryl group, an aralkyl group, an alkyl group, a halogen atom or a hydrogen atom, $R^a$, $R^b$, $R^c$ and $R^d$ represent a hydrogen atom, or a hydrocarbon group such as an alkyl, cycloalkyl, aryl or aralkyl group, or a silyl group, or two $R^c$ groups or two $R^d$ groups may be linked to form a ring, $1 \leq k \leq 3$, $1 \leq l \leq 2$, $0 \leq m \leq 2$, $0 \leq n \leq 2$, and k+l+m+n=4.

Examples of the cycloalkadienyl group represented by $R^1$ are cyclopentadienyl, methylcyclopentadienyl, ethylcyclopentadienyl, dimethylcyclopentadienyl, indenyl, and tetrahydroindenyl groups.

Examples of the cycloalkadienyl group for $R^3$ and $R^4$ may be the same as given above with regard to $R^1$.

Preferred examples of the aryl group represented by $R^3$ and $R^4$ are phenyl and tolyl groups.

Preferred examples of the aralkyl groups for $R^3$ and $R^4$ are benzyl and neophyl groups.

Examples of the alkyl group for $R^3$ and $R^4$ are methyl, ethyl, propyl, isopropyl, butyl, hexyl, octyl, 2-ethylhexyl, decyl and oleyl groups.

Examples of the halogen atom for $R^3$ and $R^4$ are fluorine, chlorine and bromine atoms.

$R^a$, $R^b$, $R^c$ and $R^d$ may be a hydrocarbon group such as an alkyl, cycloalkyl, aryl or aralkyl group, or a silyl group. Examples of the alkyl, aryl and aralkyl groups may be the same as those given above. Preferably, the cycloalkyl group is, for example, a cyclopentyl or cyclohexyl group. Examples of the silyl group are trimethylsilyl, triethylsilyl, phenyldimethylsilyl, diphenylmethylsilyl and triphenylsilyl groups.

Two $R^c$ groups or two $R^d$ groups may be linked to each other to form a heterocyclic ring, such as a 5- to 7-membered ring, preferably a 6-membered ring, together with a nitrogen atom or a phosphorus atom to which they are bonded.

A compound of formula (I) above in which $R^2$ is $OR^a$, for example a compound of the formula $Cp_2M(OR^a)_xCl_{2-x}$ wherein Cp represents a cyclopentadienyl group, can be synthesized by reacting $Cp_2MCl_2$ and a compound represented by $R^aOH$ (an alcohol compound, a silanol compound, etc.) in a solvent such as tetrahydrofuran or toluene in the presence of a tertiary amine such as triethylamine [see, for example, Donald R. Gray et al., Inorganic Chemistry, Volume 10, page 2143 (1971) and H. Suzuki et al., Bulletin of Chemical Society of Japan, Volume 48, page 2460 (1975)].

A compound of formula (I) above in which $R^2$ is $OR^b$, for example a compound represented by $Cp_2M(SR^b)_yCl_{2-y}$, can be prepared by reacting $Cp_2MCl_2$ with a compound represented by $R^bSH$ (a thioalcohol compound, a thiophenol compound, etc.) in a solvent such as tetrahydrofuran or toluene in the presence of a tertiary amine [see, for example, E.G. Muller et al., Journal of Organometallic Chemistry, volume 111, page 73 (1976) and H. Koepf, Journal of Organometallic Chemistry, volume 14, 553 (1968)].

A compound of formula (I) in which $R^2$ is $NR_2^c$, for example a compound represented by $Cp_2M(NR_2^c)_zC_{2-z}$, can be prepared by reacting $Cp_2MCl_2$ with a compound represented by $LiNR_2^c$ in a hydrocarbon solvent such as toluene [see, for example, G. Chandra et al., Journal of Chemical Society (A), page 1940, (1968)].

In the above-given formulae, x, y and z are numbers of 1 to 2.

Examples of zirconium compounds corresponding to formula (I) in which M is zirconium include bis(cyclopentadienyl)methoxy zirconium chloride,
bis(cyclopentadienyl)ethoxy zirconium chloride,
bis(cyclopentadienyl)butoxy zirconium chloride,
bis(cyclopentadienyl)2-ethylhexoxy zirconium chloride,
bis(cyclopentadienyl)methyl zirconium ethoxide,
bis(cyclopentadienyl)methyl zirconium butoxide,
bis(cyclopentadienyl)ethyl zirconium ethoxide,
bis(cyclopentadienyl)phenyl zirconium ethoxide,
bis(cyclopentadienyl)benzyl zirconium ethoxide,
bis(methylcyclopentadienyl)ethoxy zirconium chloride,
bis-(indenyl)ethoxy zirconium chloride,
bis(cyclopentadienyl)ethoxy zirconium,
bis(cyclopentadienyl)butoxy zirconium,
bis(cyclopentadienyl)2-ethylhexoxy zirconium,
bis(cyclopentadienyl)phenoxy zirconium chloride,
bis(cyclopentadienyl)cyclohexoxy zirconium chloride,
bis(cyclopentadienyl)phenyl methoxy zirconium chloride,
bis(cyclopentadienyl)methyl zirconium phenyl methoxide,
bis(cyclopentadienyl)trimethylsiloxy zirconium chloride,
bis(cyclopentadienyl)triphenylsiloxy zirconium chloride,
bis(cyclopentadienyl)thiophenyl zirconium chloride,
bis(cyclopentadienyl)thioethyl zirconium chloride,
bis(cyclopentadienyl)bis(dimethylamide)zirconium,
bis(cyclopentadienyl)diethylamide zirconium chloride,
ethylenebis(indenyl)ethoxy zirconium chloride, and
ethylenebis(4,5,6,7-tetrahydro-1-indenyl)ethoxy zirconium chloride.

Examples of titanium compounds corresponding to formula (I) in which M is titanium include bis(cyclopentadienyl)ethoxy titanium chloride,
bis(cyclopentadienyl)butoxy titanium chloride,
bis(cyclopentadienyl)methyl titanium ethoxide,
bis(cyclopentadienyl)phenoxy titanium chloride,
bis(cyclopentadienyl)trimethylsiloxy titanium chloride,
bis(cyclopentadienyl)thiophenyl titanium chloride,
bis(cyclopentadienyl)bis(dimethylamide)titanium, and
bis(cyclopentadienyl)ethoxy titanium.

Example of hafnium compounds corresponding to formula (I) in which M is hafnium include bis(cyclopentadienyl)ethoxy hafnium chloride
bis(cyclopentadienyl)butoxy hafnium chloride,
bis(cyclopentadienyl)methyl hafnium ethoxide,
bis(cyclopentadienyl)phenoxy hafnium chloride,
bis(cyclopentadienyl)thiophenyl hafnium chloride, and
bis(cyclopentadienyl)bis(diethylamide)hafnium.

The catalyst component (B) is an aluminoxane.

Examples of the aluminoxane are organoaluminum compounds represented by the following formulae (II) and (III)

wherein R represents a hydrocarbon group, and m represents a positive integer, preferably an integer of at least 5, especially preferably an integer of 10 to 100.

In formulae (II) and (III), R represents a hydrocarbon group such as an alkyl, cycloalkyl, aryl or aralkyl group. Preferred alkyl groups are lower alkyl groups such as methyl, ethyl, propyl and butyl groups. Cyclopentyl and cyclohexyl groups are preferred as the cycloalkyl groups. The aryl is preferably a phenyl or tolyl group. Examples of preferred aralkyl groups are benzyl and neophyl groups. Among these, the alkyl groups are especially preferred, and the methyl group is most preferred.

In formulae (II) and (III), m is a positive integer, preferably an integer of at least 20, particularly preferably an integer of at least 25, above all an integer of 30 to 100.

The aluminoxane can be produced, for example, by the following methods.

(1) A method which comprises adding a trialkyl aluminum to a suspension of a compound containing water of adsorption or a salt containing water of crystallization, such as magnesium chloride hydrate, copper sulfate hydrate, aluminum sulfate hydrate, nickel sulfate hydrate or cerium chloride hydrate, in a hydrocarbon medium and reacting them.

(2) A method which comprises allowing water to act directly on a trialkyl aluminum in a medium such as benzene, toluene, ethyl ether or tetrahydrofuran.

The method (1) is preferably employed. The aluminoxane may contain a small amount of an organometallic component.

The catalyst used in the process of this invention can be formed by contacting the transition metal compound catalyst component (A) with the catalyst component (B). At this time, the catalyst component (A) may be treated with an organometallic compound (C) and a halogen-containing inorganic compound (D) of an element of Group III, IV or V of the periodic table before it is contacted with the catalyst component (B). This treatment can give a catalyst having higher polymerization activity.

The organometallic compound (C) is preferably an organoaluminum, organoboron, organosilicon, organomagnesium magnesium, organozinc or organolithium compound.

Specific examples of the organoaluminum compound which preferably has at least one hydrocarbon group directly bonded to the aluminum atom are trialkyl aluminums such as trimethyl aluminum, triethyl aluminum and tributyl aluminum; alkenyl aluminums such as isoprenyl aluminum; dialkyl aluminum alkoxides such as dimethyl aluminum methoxide, diethyl aluminum ethoxide and dibutyl aluminum butoxide; alkyl aluminum sesquialkoxides such as methyl aluminum sesquimethoxide and ethyl aluminum sesquiethoxide; partially alkoxylated alkyl aluminums having the average composition of the formula $R_{2.5}^{1}Al(OR^2)_{0.5}$ wherein $R^1$ and $R^2$ are alkyl groups; dialkyl aluminum halides such as dimethyl aluminum chloride, diethyl aluminum chloride and dimethyl aluminum bromide; alkyl aluminum sesquihalides such as methyl aluminum sesquichloride and ethyl aluminum sesquichloride; and alkyl aluminum dihalides such as methyl aluminum dichloride and ethyl aluminum dichloride.

Trialkylborons such as triethylboron are preferred examples of the organoboron compound which preferably has at least one hydrocarbon group directly bonded to the boron atom.

Preferred organosilicon compounds are those which have at least one halogen atom directly bonded to the silicon atom. Specific examples of such organosilicon compounds are methyltrichlorosilane, chloromethyltrichlorosilane, vinyltrichlorosilane, ethyltrichlorosilane, 1,2-dibromoethyltrichlorosilane, 1,2-dichloroethyltrichlorosilane, 1-chloroethyltrichlorosilane, 2-chloroethyltrichlorosilane, dimethyldichlorosilane, ethyldichlorosilane, methoxytrichlorosilane and ethoxytrichlorosilane.

Examples of the organomagnesium compound preferably having at least one hydrocarbon group directly bonded to the magnesium atom are ethyl butyl magnesium, di-n-hexyl magnesium, ethyl magnesium bromide, phenyl magnesium bromide and benzyl magnesium chloride.

Dialkylzincs such as diethylzinc are preferred examples of the organozinc compound preferably having at least one hydrocarbon group directly bonded to the zinc atoms.

Examples of the organolithium compound preferably having hydrocarbon group directly bonded to the lithium atom are methyllithium, butyllithium and phenyllithium.

Organoaluminum compounds are preferred as the organometallic compound (C).

Examples of the halogen-containing inorganic compound (D) include halogenated silicon compounds such as silicon tetrachloride, silicon tetraiodide and trichlorosilane, halogenated aluminum compounds such as aluminum trichloride and aluminum tribromide, halogenated boron compounds such as boron trichloride and boron tribromide, halogenated titanium compounds such as titanium tetrachloride, titanium tetrabromide and titanium trichloride, halogenated phosphorus compounds such as phosphorus oxychloride, phosphorus pentachloride and phosphorus trichloride, and halogenated vanadium compounds such as vanadium oxytrichloride, vanadium tetrachloride and vanadium trichloride. Of these, the halogenated silicon compounds and the halogenated aluminum compounds are preferred.

The organometallic compound (C) is used in an amount of usually 0.1 to 50 moles, preferably 0.3 to 30 moles, more preferably 0.5 to 20 moles, per mole of the transition metal compound (A) in treating the transition metal compound (A).

The treatment of the catalyst component (A) with the organometallic compound (C) is carried out generally in an organic solvent. Examples of the organic solvent are aliphatic hydrocarbons such as pentane, hexane, heptane, octane, nonane and decane; alicyclic hydrocarbons such as methylcyclopentane, cyclopentane, cyclohexane, cyclooctane, cyclodecane and cyclododecane; and aromatic hydrocarbons such as benzene, toluene, xylene, cumene and cymene. Of these, aromatic hydrocarbons are preferred.

The concentration of the transition metal compound in the treating system is maintained usually at $1 \times 10^{-8}$ to 1 gram-atom/liter, preferably $1 \times 10^{-7}$ to 0.1 gram-atom/liter, as the transition metal atom.

The concentration of the organometallic compound (C) or the inorganic metal compound (D) in the treating system, calculated as the metal atom, is maintained usually at $1 \times 10^{-8}$ to 1 gram-atom/liter, preferably $1 \times 10^{-7}$ to 0.1 gram-atom/liter, as the metallic atom.

The treating temperature is usually 0° to 100° C., preferably 10° to 80° C. The time required for the treatment is usually at least 0.1 minute, preferably 1 to 200 minutes.

The transition metal compound (A) treated with the organometallic compound (C) or the inorganic metal compound (D) as above may be used as a solid catalyst by supporting it on a carrier such as silica, alumina or magnesia.

The catalyst used in this invention may be formed in a polymerization reaction vessel before or after introduction of the alpha-olefin.

Preferred examples of the alpha-olefin to be polymerized include alpha-olefins having 2 to 20 carbon atoms such as ethylene, propylene, 1-butene, 4-methyl-1-pentene, 1-hexene, 1-octene, 1-decene, 1-dodecene, 1-tetradecene, 1-hexadecene, 1-octadecene and 1-eicocene. They may be used either singly or in combination. As required, the alpha-olefin may be copolymerized with a polyene such as a diene. The process of this invention is especially preferably applied to the copolymerization of at least two alpha-olefins, such as the copolymerization of ethylene with an alpha-olefin other than ethylene or to the copolymerization of different alpha-olefins other than ethylene because it gives a copolymer having a narrow composition distribution and a narrow molecular weight distribution.

In the process of this invention, the polymerization of the olefin is carried out usually in a hydrocarbon medium. Specific examples of the hydrocarbon medium include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oils. The starting olefin can also be the hydrocarbon medium.

In practicing the process of this invention, a liquid-phase polymerization technique such as a suspension-polymerization or solution-polymerization technique is employed, but a gas-phase polymerization technique may also be employed. The temperature employed in the polymerization reaction is usually −50° to 230° C., preferably −20° to 200° C.

When the process of this invention is carried out by the liquid-phase polymerization technique, the amount of the transition metal compound (A) is usually $10^{-8}$ to $10^{-2}$ gram-atom/liter, preferably $10^{-7}$ to $10^{-3}$ gram-atom/liter, as the concentration of the transition metal atom, in the polymerization reaction system. The amount of the aluminoxane (B) is usually $10^{-4}$ to $10^{-1}$ gram-atom/liter, preferably $10^{-3}$ to $5 \times 10^{-2}$ gram-atom/liter, as the concentration of the aluminum atom in the polymerization system. The ratio between the aluminum metal atom and the transition metal atom in the polymerization reaction system which are derived from the catalyst components (A) and (B), the Al/transition metal atom, is usually from 25 to $10^7$ preferably from $10^2$ to $10^6$. The molecular weight of the polymer may be controlled by hydrogen and/or the polymerization temperature.

In the process of this invention, the desired alpha-olefin polymer may be obtained by treating the polymerization reaction mixture in a customary manner after the polymerization reaction.

The molecular weight distribution ($\overline{M}w/\overline{M}n$) and the composition distribution (B value) of the polymer obtained by this invention are determined by the following procedures.

The molecular weight distribution ($\overline{M}w/\overline{M}n$) is measured as follows in accordance with Takeuchi, "Gel Permeation Chromatography" published by Maruzen Co., Ltd., Tokyo.

(1) The GPC count of standard polystyrene (monodisperse polystyrene made by Toyo Soda Co., Ltd.) of known molecular weight M is measured, and a calibration curve for the molecular weight M versus the elution volume is drawn. The concentration of standard polystyrene at this time is adjusted to 0.02% by weight.

(2) A gel permeation chromatograph of a sample polymer is taken by GPC measurement. From the calibration curve mentioned in (1) above, the number average molecular weight $\overline{M}_n$ and the weight average molecular weight $\overline{M}_w$ of the sample are calculated. The $\overline{M}_w/\overline{M}_n$ is thus obtained. The conditions for sample preparation and GPC measurement are as follows:

Sample Preparation (a) The sample is put in an Erlenmeyer flask together with o-dichlorobenzene as a solvent so that its concentration becomes 0.1% by weight.

(b) The Erlenmeyer flask is heated to 140° C., and the mixture is stirred for about 30 minutes to form a solution.

(c) The polymer solution is subjected to GPC.

GPC measurement

The measurement is conducted under the following conditions.

(a) Device: 150C-ALC/GPC made by Waters Co.
(b) Column: GMH type made by Toyo Soda Co., Ltd., or ZORBAX PSM Bimodal-S made by E. I. Du Pont de Nemours & Co.
(c) Amount of the sample: 400 or 200 microliters
(d) Temperature: 140° C.
(e) Flow rate: 1 ml/min.

Furthermore, the ethylenic copolymer of this invention has a B value, defined by the following equation (IV), within the range defined by the following equation (V)

$$B \equiv \frac{P_{OE}}{2P_O \cdot P_E} \quad (P_O \neq 0) \tag{IV}$$

wherein $P_E$ represents the molar fraction of the ethylene component in the copolymer, $P_O$ is the molar fraction of the alpha-olefin component in the copolymer, $P_{OE}$ is the molar fraction of alpha-olefin/ethylene chains in the total dyad chains, $$1.00 \leq B \leq 2 \tag{V}$$

The B value is an index showing the state of distribution of the individual monomer components in the copolymer chain, and can be calculated from $P_E$, $P_O$ and $P_{OE}$ which are measured on the basis of G. J. Ray, Macromolecules, 10, 773 (1977), J. C. Randall, Macromolecules, 15, 353 (1982), J. Polymer Science, Polymer Physics Ed., 11, 275 (1973), and K. Kimura, Polymer, 25, 441 (1984).

As the B value is larger, the copolymer has less blocked chains, a more uniform distribution of ethylene and alpha-olefin and a narrower composition distribution.

Preferably, the ethylenic copolymer in accordance with this invention has the following B values.

When the copolymer has an ethylene content of not more than 50 mole %:

preferably $$1.0 + 0.3 \times P_E \leq B \leq 1/(1-P_E),$$

more preferably $$1.0 + 0.4 \times P_E \leq B \leq 1/(1-P_e),$$

especially preferably $$1.0 + 0.5 \times P_E \leq B \leq 1/(1-P_E).$$

When the copolymer has an ethylene content of more than 50 mole %:

preferably $$1.3 - 0.3 \times P_E \leq B \leq 1/P_e,$$

more preferably $$1.4 - 0.4 \times P_E \leq B \leq 1/P_E$$

especially preferably $$1.5 - 0.5 \times P_E \leq B \leq 1/P_e.$$

The B value was determined as follows: A sample is prepared by uniformly dissolving about 200 mg of the copolymer in 1 ml of hexachlorobutadiene in a sample tube having a diameter of 10 mm. The $^{13}$C-NMR spectrum of the sample is usually measured under the following conditions.

Temperature: 120° C.

Frequency: 25.05 MHz
Spectral width: 1500 Hz
Filter width: 1500 Hz
Pulse repeating time: 4.2 sec
Pulse width: 7 microseconds Integration cycles: 2000 to 5000 $P_E$, $P_O$ and $P_{OE}$ are determined from the spectrum, and the B value is calculated from these.

The process of this invention can easily give alpha-olefin polymers having a narrow molecular weight distribution and a narrower composition distribution with high catalytic activity.

A copolymer having ethylene units as a major component produced by the present invention provides films having good transparency, low surface tackiness and good mechanical propeties.

This invention also has the advantage that since the halogen content of the catalyst component can be decreased, the halogen content of the resulting alpha-olefin polymer can also be decreased, and that the stability of the catalyst can be increased.

BEST MODE FOR PRACTICING THE INVENTION

The following examples illustrate the process of this invention more specifically.

EXAMPLE 1

Preparation of a catalyst component (B) (aluminoxane)

A 200 ml flask purged fully with argon was charged with 5.6 g of $MgCl_2.6H_2O$ and 50 ml of toluene. The mixture was cooled to 0° C. and then 100 millimoles of trimethyl aluminum diluted with 50 ml of toluene was added dropwise. Subsequently, the mixture was heated to 70° C., and maintained at this temperature for 80 hours. After the reaction, the reaction mixture was subjected to solid-liquid separation by filtration. Toluene was removed from the separated liquid to obtain methylaluminoxane as a white solid. The methylaluminoxane was used as a solution in toluene in the polymerization described below. The methylaluminoxane had a molecular weight, determined by freezing point depression in benzene, of 1660, and the m value shown in the catalyst component (B) corresponded to 27.

Polymerization

A 500 ml glass autoclave purged fully with nitrogen was charged with 250 ml of purified toluene, and a gaseous mixture of ethylene and propylene (60 liters/hr and 40 liters/hr respectively) was passed through the autoclave and maintained at 20° C. for 10 minutes. Subsequently, 1.25 milligram-atom, as the aluminum atom, of methylaluminoxane [catalyst component (B)] and $1.25\times10^{-3}$ milligram-atom, as the zirconium atom, of bis(cyclopentadienyl) phenoxy zirconium monochloride [catalyst component (A)] were introduced into the autoclave, and the polymerization of the ethylene/propylene gaseous mixture was started. The polymerization was carried out at 20° C. under atmospheric pressure for 1 hour, and then stopped by adding a small amount of isopropanol. The polymer solution was poured into a large amount of methanol to precipitate the resulting polymer. The polymer was dried overnight under reduced pressure at 130° C. After drying the amount of the polymer obtained was 10.0 g, and the activity was 8000 g of polymer/milligram-atom of zirconium. The resulting ethylene/propylene copolymer had an ethylene content of 78.2 mole %, an MFR of 0.43 g/10 min., an $\overline{M}w/\overline{M}n$ of 2.05, and a B value of 1.17.

EXAMPLE 2

Example 1 was repeated except that in the polymerization of Example 1, 200 ml of toluene and 50 ml of 1-hexene were introduced into the autoclave, and while ethylene was passed through it at a rate of 100 liters/hr, $2.5\times10^{-4}$ milligram-atom, as the zirconium atom, of bis (cyclopentadienyl)phenoxy zirconium monochloride and 1.25 milligram-atom, as the aluminum atom, of the methylaluminoxane synthesized in Example 1 were added, and that the polymerization was carried out at 60° C. for 0.5 hour. There was obtained 10.5 g of an ethylene/1-hexene copolymer having an MFR of 0.65 g/10 min., a density of 0.922 g/cm³ and an $\overline{M}w/\overline{M}n$ of 2.15. The activity was 42,000 g of polymer/milligram-atom of zirconium.

EXAMPLE 3

Example 1 was repeated except that bis(cyclopentadienyl) thiopenyl zirconium monochloride was used instead of bis(cyclopentadienyl)phenoxy zirconium monochloride, and the polymerization time was changed to 0.5 hour. There was obtained 11.3 g of an ethylene/propylene copolymer having an ethylene content of 78.6 mole %, an MFR of 1.15 g/10 min., an $\overline{M}w/\overline{M}n$ of 2.10 and a B value of 1.13. The activity was 9,000 g of polymer/milligram-atom of zirconium.

EXAMPLE 4

Example 1 was repeated except that bis(cyclopentadienyl) phenyl methoxy zirconium monochloride was used instead of bis(cyclopentadienyl)phenoxy zirconium monochloride. There was obtained 4.2 g of an ethylene/propylene copolymer having an ethylene content of 79.2 mole %, an MFR of 0.89 g/10 min., an $\overline{M}w/\overline{M}n$ of 2.22 and a B value of 1.11. The activity was 3,400 g of polymer/milligram-atom of zirconium.

EXAMPLE 5

The same polymerization as in Example 1 was carried out except that a gaseous mixture of ethylene and propylene (15 liters/hr and 85 liters/hr respectively) was passed through the autoclave, and bis(cyclopentadienyl)phenoxy zirconium monochloride was used in an amount of $5\times10^{-3}$ milligram-atom as the zirconium atom, and that the polymerization was carried out at 40° C. After the polymerization, the polymer solution was poured into aqueous hydrochloric acid solution to remove the catalyst residue. The polymer was washed with water several times and dried overnight under reduced pressure. There was obtained 9.5 g of a liquid ethylene/propylene copolymer having an ethylene content of 49.3 mole %, an intrinsic viscosity of 0.12 dl/g, an $\overline{M}w/\overline{M}n$ of 1.89 and a B value of 1.26. The activity was 1,900 g of polymer/milligram-atom of zirconium.

EXAMPLE 6

The same polymerization as in Example 1 was carried out except that toluene was not used, 250 ml of 1-hexene was used instead of the gaseous mixture of ethylene and propylene, $5\times10^{-3}$ milligram-atom, as zirconium, of bis (cyclopentadienyl)thiophenyl zirconium monochloride was used as the catalyst component (A), and the polymerization was carried out at 50° C. for 2 hours. The resulting polymer solution was worked up as in Example 5 to give 16.8 g of liquid 1-hexene homopolymer having an intrinsic viscosity of 0.04 dl/g and an $\overline{M}w/\overline{M}n$ of 2.01. The activity was 3,360 g of polymer/milligram-atom of zirconium.

EXAMPLE 7

Treatment of a catalyst component (A) (zirconium catalyst)

A 200 ml glass flask purged fully with nitrogen was charged with 50 ml of a toluene solution of bis (cyclopentadienyl)ethoxy zirconium monochloride (Zr 1.35 millimoles/liter) and 34 ml of dimethyl aluminum chloride (Al 4 millimoles/liter), and the mixture was reacted at 25° C. for 0.5 hour to obtain a catalyst component (A).

Polymerization

Purified toluene (250 ml) was charged into a 500 ml glass autoclave purged fully with nitrogen, and a gaseous mixture of ethylene and propylene (60 liters/hr and 40 liters/hr respectively) was passed through the autoclave and maintained at 20° C. for 10 minutes. Subsequently, 1.25 milligram-atom, as the aluminum atom, of methylaluminoxane [catalyst component (B)]and $2.5 \times 10^{-4}$ milligram-atom, as the zirconium atom, of the catalyst component (A) synthesized above were introduced into the autoclave, and the polymerization of the ethylene/propylene gaseous mixture was started. The polymerization was carried out at 20° C. under atmospheric pressure for 0.5 hour, and then stopped by adding a small amount of isopropanol. The polymer solution was poured into a large amount of methanol to precipitate the polymer. The polymer was dried overnight at 130° C. under reduced pressure. After drying, the amount of the polymer obtained was 5.7 g. The activity was 22,800 g of polymer/milligram-atom of zirconium. The resulting ethylene/propylene copolymer had an ethylene content of 83.1 mole %, an MFR of 0.38 g/10 min., an $\overline{Mw}/\overline{Mn}$ of 1.96 and a B value of 1.16.

EXAMPLE 8

Example 7 was repeated except that in the polymerization, 230 ml of toluene and 20 ml of 4-methyl-1-pentene were introduced into the autoclave, and while ethylene was passed through the autoclave at a rate of 100 liters/hr, $5 \times 10^{-4}$ milligram-atom, as the zirconium atom, of the catalyst component (A) and 2.5 milligram-atom, as the aluminum atom, of the catalyst component (B) were added, and that the polymerization was carried out at 60° C. for 0.5 hour. There was obtained 22.7 g of an ethylene/4-methyl-1-pentene copolymer having an MFR of 2.45 g/10 min., a density of 0.926 g and an $\overline{Mw}/\overline{Mn}$ of 2.10. The activity was 45,400 g of polymer/milligram-atom of zirconium.

EXAMPLE 9

Example 7 was repeated except that in the polymerization, 175 ml of toluene and 75 ml of 1-hexene were introduced into the autoclave, and while ethylene was passed through the autoclave at a rate of 100 liters/hr, $1.25 \times 10^{-3}$ milligram-atom, as the zirconium atom, of the catalyst component (A) was added. There was obtained 10.6 g of an ethylene/1-hexene copolymer having an ethylene content of 80.3 mole %, an MFR of 2.94 g/10 min., an $\overline{Mw}/\overline{Mn}$ of 1.84 and a B value of 1.21. The activity was 8,500 g of polymer/milligram-atom of zirconium.

EXAMPLE 10

A 1-liter continuous polymerization reactor was continuously charged hourly with 500 ml of purified toluene, $5 \times 10^{-3}$ milligram-atom, as the zirconium atom, of the catalyst component (A) in Example 7 and 2.5 milligram-atom, as the aluminum atom, of the catalyst component (B) synthesized in Example 7. Furthermore, 150 liters/hr of ethylene, 100 liters/hr of propylene and 1.2 g/hr of 5-ethylidene-2-norbornene (ENB) were simultaneously fed into the reactor continuously, and polymerized at a temperature of 20° C. under atmospheric pressure with a residence time of 1 hour while the concentration of the polymer was maintained at 17 g/liter. The resulting polymer solution was worked up in the same way as in Example 7 to give an ethylene/propylene/ENB copolymer having an ethylene content of 83 mole %, an MFR of 3.59 g/10 min., an $\overline{Mw}/\overline{Mn}$ of 2.10 and an iodine value of 13. The activity was 1,700 g of polymer/milligram-atom of zirconium.

EXAMPLE 11

The same polymerization as in Example 7 was carried out except that a gaseous mixture of ethylene and propylene (15 liters/hr and 80 liters/hr respectively) was used instead of the ethylene/propylene gaseous mixture used in Example 7, the catalyst component (A) was used in an amount of $5 \times 10^{-3}$ milligram-atom as the zirconium atom, and the polymerization was carried out at 40° C. for 1 hour. After the polymerization, the polymer solution was poured into aqueous hydrochloric acid solution to remove the catalyst residue. The polymer was washed with water several times, and dried overnight at 130° C. under reduced pressure to give 16.8 g of a liquid ethylene/propylene copolymer having an ethylene content of 45.6 mole %, an intrinsic viscosity of 0.122 dl/g, an $\overline{Mw}/\overline{Mn}$ of 1.75 and a B value of 1.29. The activity was 3,360 g of polymer/milligram of zirconium.

EXAMPLE 12

The same polymerization as in Example 7 was carried out except that toluene was not used, 250 ml of 4-methyl-1-pentene was used instead of the ethylene/propylene gaseous mixture, the catalsyt component (A) was used in an amount of $5 \times 10^{-3}$ milligram-atom as the zirconium atom, and the polymerization was carried out at 50° C. for 2 hours. The resulting polymer solution was worked up as in Example 11 to give 17.3 g of a liquid 4-methyl-1-pentene homopolymer having an intrinsic viscosity of 0.04 dl/g and an $\overline{Mw}/\overline{Mn}$ of 2.09. The activity was 3,460 g of polymer/milligram-atom of zirconium.

EXAMPLE 13

The same polymerization as in Example 7 was carried out except that a gaseous mixture of propylene and 1-butene (75 liters/hr and 175 liters/hr respectively) was passed through the autoclave instead of the ethylene/propylene gaseous mixture, the catalyst component (A) was used in an amount of $5 \times 10^{-3}$ milligram-atom as the zirconium atom, and the polymerization was carried out at 50° C. for 2 hours. The resulting polymer solution was worked up in the same way as in Example 11 to give 4.3 g of a liquid propylene/1-butene copolymer having a propylene content of 35.4 mole %, an intrinsic viscosity of 0.01 dl/g and an $\overline{Mw}/\overline{Mn}$ of 2.12. The activity was 860 g of polymer/milligram-atom of zirconium.

EXAMPLE 14

Treatment of a catalyst component (A)

A catalyst component (A) was treated in the same way as in Example 7 except that 0.14 millimole of trimethyl aluminum was used instead of dimethyl aluminum chloride.

Polymerization

The same polymerization as in Example 7 was carried out except that the catalyst component (A) synthesized above was used instead of the catalyst component (A) used in Example 1. There was obtained 4.5 g of an ethylene/ propylene copolymer having an ethylene content of 87.6 mole %, an MFR of 0.67 g/10 min., an $\overline{M}w/\overline{M}n$ of 2.21 and a B value of 1.12. The activity was 18,000 g of polymer/milligram-atom of zirconium.

EXAMPLE 15

Treatment of a catalyst component (A)

Example 7 was carried out except that 0.14 millimole of diethyl aluminum chloride was used instead of dimethyl aluminum chloride.

Polymerization

The same polymerization as in Example 7 was carried out except that a gaseous mixture of ethylene and 1-butene (60 liters/hr and 40 liters/hr respectively) was used instead of the ethylene/propylene gaseous mixture, the catalyst component (A) prepared above was used in an amount of $1.25 \times 10^{-3}$ milligram-atom as the zirconium atom, and the polymerization was carried out at 20° C. for 15 minutes. There was obtained 4.9 g of an ethylene/1-butene copolymer having an ethylene content of 87.0 mole %, an MFR of 0.35 g/10 min., an $\overline{M}w/\overline{M}n$ of 2.18 and a B value of 1.15. The activity was 3,920 g of polymer/milligram-atom of zirconium.

EXAMPLE 16

Treatment of a catalyst component (A)

Dimethyl aluminum chloride (25 ml; Al 10 millimoles/liter-toluene) was added to 25 ml of a toluene solution of bis(cyclopentadienyl)tert-butoxy zirconium monochloride (Zr 10 millimoles/liter), and the mixture was reacted at 30° C. for 20 minutes to prepare a catalyst component (A).

Polymerization

The same polymerization as in Example 7 was carried out except that 210 ml of toluene and 40 ml of 1-hexene were introduced into the autoclave, and while passing ethylene into the autoclave at a rate of 100 liters/hr, $1.25 \times 10^{-3}$ milligram-atom, as the zirconium atom, of the catalyst component (A) obtained above was added. There was obtained 12.2 g of an ethylene/1-hexene copolymer having an ethylene content of 86.5 mole %, an MFR of 0.53 g/10 min., an $\overline{M}w/\overline{M}n$ of 1.96 and a B value of 1.16. The activity was 9,760 g of polymer/milligram-atom of zirconium.

EXAMPLE 17

Treatment of a catalyst component (A)

Dimethyl aluminum chloride (50 ml; Al 10 millimoles/liter) was added to 25 ml of a toluene solution of bis(cyclopentadienyl)n-butoxy zirconium chloride [(cyclopentadienyl)$_2$ZrCl$_{0.25}$(n-OBu)$_{1.75}$] (Zr 10 millimole/liter), and the mixture was reacted at 30° C. for 30 minutes to prepare a catalyst component (A).

Polymerization

The same polymerization as in Example 7 was carried out except that the catalyst component (A) obtained above was used instead of the catalyst component (A) used in Example 7. There was obtained 5.1 g of an ethylene/propylene copolymer having an ethylene content of 84.3 mole %, an MFR of 0.40 g/10 min., an $\overline{M}w/\overline{M}n$ of 2.03 and a B value of 1.14. The activity was 20,400 g of polymer/milligram-atom of zirconium.

EXAMPLE 18

In the polymerization of Example 7, charging of toluene, ethylene and propylene was carried out in the same way. Subsequently, $2.5 \times 10^{-4}$ milligram-atom, as the zirconium atom, of bis(cyclopentadienyl)ethoxy zirconium monochloride and $5.0 \times 10^{-4}$ milligram-atom, as the aluminum atom, of dimethyl aluminum chloride were introduced into the autoclave. The mixture was stirred for several minutes. Thereafter, 1.25 milligram-atom, as the aluminum atom, of the catalyst component (B) synthesized in Example 7 was added, and the polymerization of the ethylene/propylene mixture was started. The subsequent operation was performed in the same way as in Example 7. There was obtained 3.8 g of an ethylene/propylene copolymer having an ethylene content of 84.3 mole %, an MFR of 0.42 g/10 min., an $\overline{M}w/\overline{M}n$ of 2.11 and a B value of 1.12. The activity was 15,200 g of polymer/milligram-atom of zirconium.

EXAMPLE 19

Treatment of a catalyst component (A)

Example 7 was carried out except that bis(cyclopentadienyl)phenoxy zirconium chloride was used instead of bis(cyclopentadienyl)ethoxy zirconium monochloride to prepare a catalyst component (A).

Polymerization

The same polymerization as in Example 7 was carried out except that the catalyst component (A) prepared above was used instead of the catalyst component (A) used in Example 7. There was obtained 6.0 g of an ethylene/propylene copolymer having an ethylene content of 82.5 mole %, an MFR of 0.41 g/10 min., an $\overline{M}w/\overline{M}n$ of 2.00 and a B value of 1.16. The activity was 24,000 g of polymer/milligram-atom of zirconium.

EXAMPLE 20

Treatment of a catalyst component (A)

Example 7 was repeated except that bis(cyclopentadienyl)thiophenyl zirconium monochloride was used instead of bis(cyclopentadienyl)ethoxy zirconium monochloride to prepare a catalyst component (A).

Polymerization

The same polymerization as in Example 9 was carried out except that the catalyst component (A) prepared above was used instead of the catalyst component (A) used in Example 9. There was obtained 9.5 g of an ethylene/1-hexene copolymer having an ethylene content of 81.5 mole %, an MFR of 2.50 g/10 min., an $\overline{M}w/\overline{M}n$ of 1.90 and a B value of 1.19. The activity was 7,600 g of polymer/milligram-atom of zirconium.

EXAMPLE 21

Treatment of a catalyst component (A)

Fifty milliliters of a toluene solution of bis(cyclopentadietnyl)ethoxy zirconium chloride (Zr 0.049 mole/liter) was fed into a thoroughly nitrogen-purged 200 ml glass flask, and 1.2 ml of a toluene solution of silicon tetrachloride (Si 1.0 mole/liter) was further added. They were reacted at 25° C. for 0.5 hour to give a catalyst component (A).

Polymerization

The same polymerization as in Example 7 was carried out except that the resulting catalyst component (A) was used. There was obtained an ethylene/propylene copolymer having an ethylene content of 83.0 mole %, a MFR of 0.40 g/10 min., a $\overline{M}w/\overline{M}n$ of 2.00 and a B value of 1.16. The activity was 20,400 g of polymer/milligram-atom of Zr.

The transition metal compounds (A) used in the foregoing Examples were prepared as follows (1) Synthesis of bis(cyclopentadienyl)phenoxy zirconium monochloride (this compound was used in Examples 1, 2, 5 and 19)

In 80 ml of toluene was dissolved 1.05 g of bis(cyclopentadienyl)zirconium dichloride, and 0.63 ml of phenol was added to the solution. Subsequently, 8.6 ml of triethylamine (1.0 mole/liter) diluted with toluene was added dropwise with stirring. At this time, triethylamine-HCl adduct precipitated. After the addition, the temperature was elevated to 60° C. and at this temperature, the reaction was carried out for 1 hour. After the reaction, the precipitated triethylamine-HCl adduct was removed by filtration, and toluene was removed from the filtrate by using an evaporator. The resulting solid was again dissolved in 10 ml of toluene, and 25 ml of hexane was added to the solution. The solution was cooled to −60° C. By this operation, a solid precipitated. The solid portion was separated by filtration, and washed with 25 ml of hexane to obtain the above-compound (1).

(2) Synthesis of bis(cyclopentadienyl) thiophenyl zirconium chloride (this compound was used in Examples 3, 6 and 20)

The operation of synthesizing the compound (1) was almost similarly repeated except that 8.7 ml of thiophenol was used instead of 0.63 ml of phenol.

(3) Synthesis of bis(cyclopentadienyl) phenylmethoxy zirconium chloride (this compound was used in Example 4)

The operation of synthesizing the compound (1) was almost similarly repeated except that 0.75 ml of benzyl alcohol was used instead of 0.63 ml of phenol.

(4) Synthesis of bis(cyclopentadienyl) ethoxy zirconium chloride (this compound was used in Examples 7 to 15, 18 and 21)

The operation of synthesizing the compound (1) was almost similarly repeated except that 7.3 ml of an ethanol/toluene mixture (1 mole ethanol/1 liter toluene) was used instead of 0.63 ml of phenol.

(5) Synthesis of bis(cyclopentadienyl) t-butoxy zirconium chloride (this compound was used in Example 16)

The operation of synthesizing the compound (1) was almost similarly repeated except that 7.3 ml of a t-butanol/toluene mixture (1 mole t-butanol/1 liter toluene) was used instead of 0.63 ml of phenol.

(6) Synthesis of bis(cyclopentadienyl) n-butoxy zirconium chloride (this compound was used in Example 17)

The operation of synthesizing the compound (1) was almost similarly repeated except that 8.7 ml of a n-butanol/toluene mixture (1 mole n-butanol/1 liter toluene) was used instead of 0.63 ml of phenol.

INDUSTRIAL UTILIZABILITY

According to the process of this invention, a homopolymer of an alpha-olefin having a narrow molecular weight distribution, and an alpha-olefin copolymer having a narrow molecular weight distribution and a narrow composition distribution can be obtained.

We claim:

1. A catalyst for use in polymerizing an alpha-olefin, which is formed from (A) a transition metal compound represented as an average composition by the following formula (I)

$$R^1_k R^2_l R^3_m R^4_n M \qquad (I)$$

wherein

M represents a zirconium or hafnium atom, $R^1$ represents a cycloalkadienyl group, $R^2$ is an —$OR^a$ group or an —$SR^b$ group, $R^3$ and $R^4$ are identical or different and each represents a cycloalkadienyl group, an alkyl group or a halogen atom, $R^a$ and $R^b$ each represent a hydrocarbon selected from the group consisting of an alkyl group, a cycloalkyl group, an aryl group and an aralkyl group, $1 \leq k \leq 3$, $1 \leq l \leq 2$, $0 \leq m \leq 2$, $0 \leq n \leq 2$, and $k+l+m+n=4$;

and (B) an aluminoxane;

wherein said transition metal compound (A) is treated with (D) a silicon tetrahalide before it is contacted with said aluminoxane, said treatment being effected in an organic solvent at a temperature of 0° to 100° C. for 1 to 200 minutes, said silicon tetrahalide (D) having a concentration, in said organic solvent, of $1\times10^{-8}$ to 1 gram-atom/liter, as the metallic atom.

* * * * *